March 14, 1961     T. P. CAREY     2,974,647
FLUID CONTROL SYSTEM
Filed Jan. 29, 1959
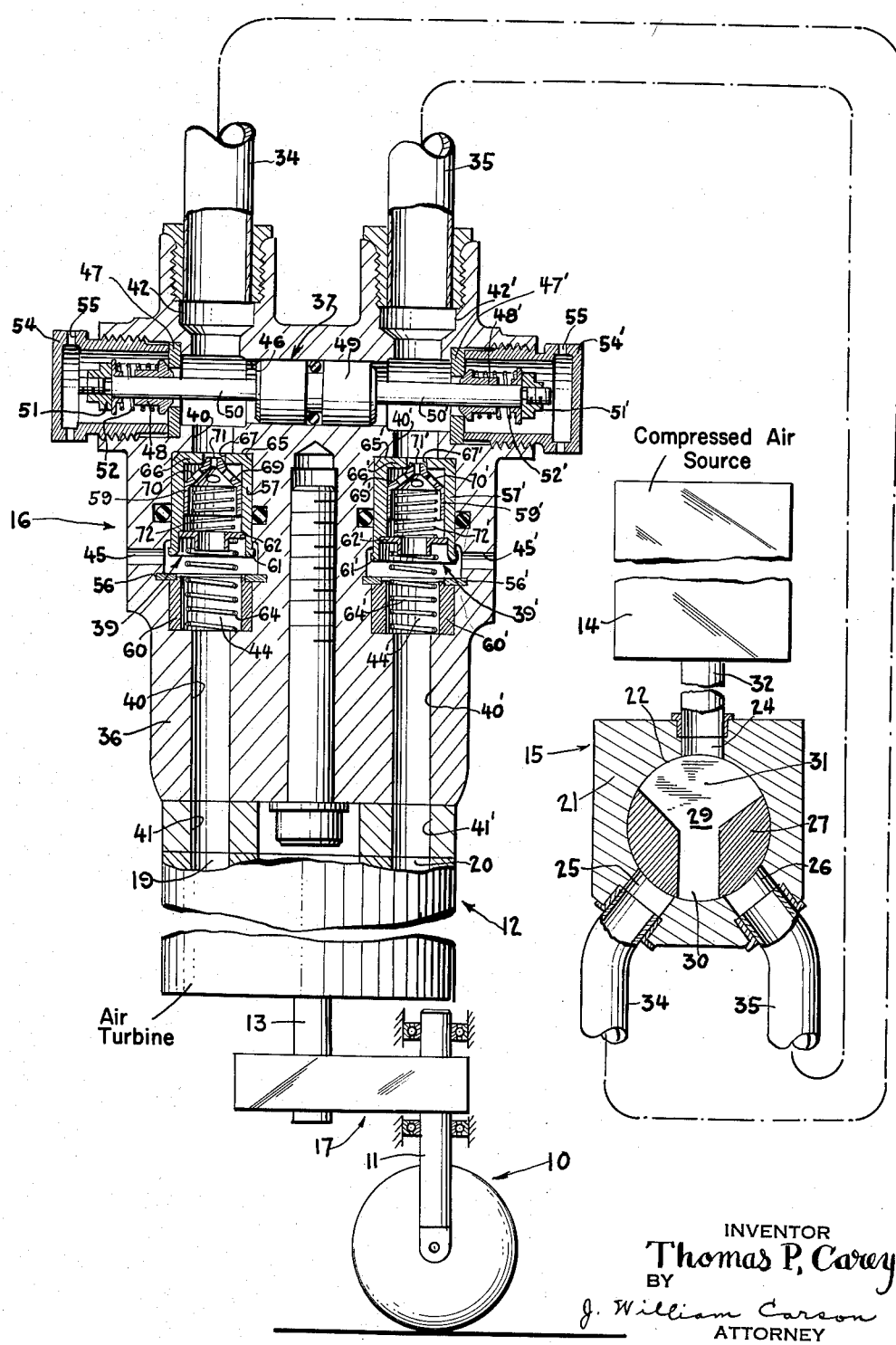
INVENTOR
Thomas P. Carey
BY
J. William Carson
ATTORNEY United States Patent Office 2,974,647
Patented Mar. 14, 1961

2,974,647

FLUID CONTROL SYSTEM

Thomas P. Carey, Belleville, N.J., assignor to Specialties Development Corporation, Belleville, N.J., a corporation of New Jersey Filed Jan. 29, 1959, Ser. No. 789,974

6 Claims. (Cl. 121—157)

The present invention relates to fluid control systems, and, more particularly, to such systems in which pressurized gas is utilized to control the rotational position of a controlled member.

In aircraft having a tricycle landing gear arrangement including a steerable nose wheel controlled by pilot operated means for steering the aircraft when taxiing, it is generally preferred that the nose wheel is free to swivel like a caster when the pilot's control member is in a neutral position. This allows the pilot to steer the aircraft by differential braking of the main wheels, if he prefers to do so, without dragging the nose wheel sideways across the ground. Also, with this arrangement, steering with the nose wheel is simplified because the pilot, after steering the aircraft onto the desired course, need only return his control member to a neutral position to maintain his direction since the nose wheel will then caster to a straight ahead position.

In most modern aircraft, a pressurized fluid system is required to operate the controls because of the magnitude of the forces acting on the controls and the distance between the controls and the pilot. In many instances, a pneumatic system utilizing a gaseous fluid such as air is more desirable than one using a hydraulic fluid such as oil because the air does not present a fire hazard whereas the oil does, and is more reliable since it can operate indefinitely with a minor leak present. Also, an air operated system is lighter because it does not require the return lines required in a hydraulic system, and the air can be drawn from the atmosphere and compressed, whereby the weight of a supply of hydraulic fluid is eliminated.

Although pneumatic systems have been used successfully in the past for operating the relatively slow moving and non-castering controls of an aircraft such as the control surfaces, the residual or back pressures which are inherently present in systems using a compressible fluid, have heretofore prevented such systems from being used successfully in connection with controls such as a steering nose wheel gear which must be capable of rapidly reversing its direction of rotation both when the direction of flow of the pressurized gas is reversed and when the flow of the gas is stopped.

Accordingly, an object of the present invention is to provide a pneumatic system for controlling the swiveling of a member such as the nose wheel of aircraft steering gear.

Another object is to provide such a system in which the wheel is swiveled rapidly to a desired position in response to a change in the direction of gas flow.

Another object is to provide such a system in which the wheel is placed in condition to swivel when the air flow is stopped.

A further object is to provide such a system wherein a control unit rapidly vents back pressure.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein the single figure of the drawing is a diagrammatic view of a pneumatic steering system in accordance with the present invention, illustrating a control valve and a venting control unit in enlarged longitudinal section.

Referring to the drawing in detail, there is shown a system in accordance with the present invention which generally comprises an aircraft nose wheel landing gear 10 including a shaft 11, a reversible rotary air motor 12 of the turbine type having a shaft 13 for rotating the shaft 11 about its longitudinal axis to swivel the wheel and effect steering of the aircraft, a source of air under pressure 14 for driving the air motor, a control valve 15 operable by the pilot for controlling the direction of rotation of the air motor, and a venting unit 16 for removing back pressure from the system.

The air motor 12 is positioned in the nose of the aircraft adjacent the nose wheel shaft 11 and its shaft 13 drives the shaft 11 through a gear train 17. A pair of ports 19 and 20 are provided in the air motor and are each adapted for use as an inlet or an outlet depending upon the direction in which the air motor is to be rotated.

The valve 15 is positioned in the pilot's compartment, and includes a body 21 provided with a cylindrical bore 22 having an inlet 24 and a pair of spaced outlets 25 and 26 opposite the inlet 24. A cylindrical valve member 27, provided with a Y-shaped passageway 29 having a narrow portion 30 and a divergent portion 31, is positioned in the bore 22 with the passageway portion 31 in communication with the inlet 24. The valve member 27 is adapted to be rotated to selectively place the passageway portion 30 in communication with one of the outlets or in the neutral position, as shown. The inlet 24 is connected to the source 14 by means of a conduit 32, and a pair of long conduits 34 and 35, connected to the outlets 25 and 26 respectively, extend from the pilot's compartment to the nose of the aircraft for connection to the venting unit 16.

The venting unit 16 generally includes a casing 36, a shuttle valve 37, and a pair of venting check valves 39 and 39'. The casing is provided with a pair of passageways 40 and 40' extending respectively from a pair of ports 41 and 41' at the lower end thereof to a pair of ports 42 and 42' at the upper end thereof. The ports 41 and 41' are positioned to be in communication with the air motor ports 19 and 20 respectively, and the conduits 34 and 35 are respectively connected to the ports 42 and 42'. Each of the passageways 40 and 40' has an enlarged bore portion 44 and 44' respectively, and a plurality of venting ports 45 and 45' respectively extend through the casing adjacent the lower ends of the bore portions 44 and 44'. The casing 36 is also provided with a bore 46 extending transversely therethrough in intersecting relationship with the passageways 40 and 40'.

The shuttle valve 37 is positioned in the bore 46, and generally comprises a pair of valve seats 47 and 47' at the opposite ends of the bore 46, a pair of valve members 48 and 48', and a valve member operating mechanism including a piston 49 slidably mounted in the bore 46 between the passageways 40 and 40'. The piston 49 has a pair of stems 50 and 50' extending from each end thereof past the valve seats 47 and 47', and a pair of abutments 51 and 51' are mounted on the end of the stems 50 and 50' respectively. The valve members 48 and 48' are slidably mounted on the stems 50 and 50' respectively, outwardly of the seats 47 and 47', and a pair of springs 52 and 52' are positioned between the abutments and the valve members to urge the valve members toward the seats. The seats 47 and 47' are respectively held in position by hollow studs 54 and 54' screw threaded into the casing 36 and having a plurality of venting openings 55.

The venting check valves 39 and 39' are positioned in the enlarged bore portions 44 and 44' respectively, and each valve respectively includes a valve seat 56 and 56', a spring biased hollow piston 57 and 57', and a spring biased cup shaped check valve member 59 and 59' positioned within the piston. The valve seats 56 and 56' are positioned between the venting ports 45 and 45' and the ports 41 and 41' and are supported by annular members 60 and 60' located in the bottom of the enlarged bore portions 44 and 44'. The pistons 57 and 57' are slidably mounted in the passageway portions 44 and 44' above the seats and have open lower ends formed with annular seat abutting surfaces 61 and 61'. A pair of annular spring supporting members 62 and 62' are provided at the lower ends of the pistons 57 and 57' and a pair of springs 64 and 64' bear against the members 62 and 62' urging the pistons upwardly against the end walls 65 and 65' of the bore portions 44 and 44'. The upper walls 66 and 66' of the pistons are provided with apertures 67 and 67', and the check valve members 59 and 59' have conical upper end walls 69 and 69' dimensioned to respectively extend into these aperatures. The walls 69 and 69' are each provided with a plurality of side openings 70 and 70' and an end opening 71 and 71', and springs 72 and 72' seated against the support members 62 and 62' respectively urge the check valve members upwardly.

As shown herein, the venting unit is mounted on top of the air motor 12 to reduce the distance between the air motor vents to a minimum, whereby rapid venting of the air motor is accomplished.

In operation, when the pilot is taxiing the aircraft in a straight line, or steering by means of differential braking, his control member is centered, thereby placing the valve member 27 of the valve 15 in the neutral position as shown in the drawing, and the venting unit 16 is unpressurized. The pistons 57 and 57' are then held against the walls 65 and 65' by the springs 64 and 64' placing both of the ports 19 and 20 of the air motor 12 in communication with the atmosphere through the ports 45 and 45'. The nose wheel gear, therefore, can swivel freely since the ports 45 and 45' allow air to flow freely through the air motor when the air motor is rotated by the turning of the gear 10, thus precluding the formation of back pressures due to the pumping action of the rotated air motor.

When the pilot wishes to change the direction of the taxiing aircraft by means of nose wheel steering, for example to the right, he turns his control member to the right thereby rotating the valve member 27 clockwise and placing the narrow portion 30 of the passageway 29 in communication with the port 25. Compressed air then flows from the source 14 through the passageway 29 and the conduit 34 to the passageway 40 in the venting unit 16 where it acts against the pistons 49 and 57. The piston 49 is moved to the right forcing the valve member 48 tightly against its seat 47 and moving the valve member 48' away from its seat 47'. The piston 57 is moved downwardly until the surface 61 abuts the seat 56 to seal off the venting ports 45. The compressed air in the passageway 40 then acts on the portion of the conical wall 69 of the check valve member 59 extending into the aperture 67 in the upper wall 66 of the piston 57, and the check valve member 59 moves downwardly thereby allowing the compressed air to flow through the openings 70 to the port 19 of the air motor. The gas flows through the air motor from the port 19 to the port 20 causing the air motor to rotate the shaft 11, and then flows from the port 20 upwardly through the passageway 40' and through the ports 45' to the atmosphere. The piston 57 and the check valve member 59 are held in their downward position by the decrease in pressure on their downstream sides resulting from the flow of the pressurized gas through the port 67 and the ports 70.

When the aircraft has assumed the desired new direction, the pilot returns his control member to its neutral position and the valve member 29 returns to its neutral position thereby cutting off the supply of compressed air to the air motor. The compressed air trapped in the conduit 34 expands and flows through the port 67 and the ports 70 to equalize the pressures acting on the valve member 59 and allow the spring 72 to move the member 59 upwardly to close the port 67. The gas in the conduit 34 then expands through the port 71 and equalizes the pressures acting on the piston 57 thereby allowing the spring 64 to move the piston upwardly away from the seat 56 to vent the port 19 of the air motor. The venting unit is then again in the condition shown in the drawing and the nose wheel gear can swivel freely to maintain the desired heading.

If the pilot wishes to quickly turn the aircraft back to the left during the period when the passageway 29 of the valve 15 is in communication with the port 25 so that the aircraft is turning to the right, he moves his control member whereby the passageway 29 is rapidly placed in communication with the port 26. The pressurized gas then flows through the conduit 35 to the venting unit where it moves the piston 49 to the left and drives the piston 57' and the check valve member 59' downwardly. The motion of the piston 49 moves the valve member 51 away from its seat 47 whereby venting the pressure in the conduit 34. The piston 57 then moves upwardly to rapidly vent the port 19 and prevent the air motor from being momentarily locked by the pressure trapped in the conduit 34, wherefore, the direction of rotation of the air motor and the nose wheel gear can be rapidly reversed.

From the foregoing description, it will be seen that the present invention provides a pneumatic system for selectively controlling the rotational position of a swivelled member in which back pressure is vented so that the rotational position of the member changes rapidly in response to a change in direction of compressed air flow and the member is quickly placed in condition to swivel when the air flow is stopped.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a vehicle steering system, the combination of a steering gear mechanism including a rotatable shaft; a reversible pneumatic fluid driven motor of the air turbine type through which the fluid passes including a rotatable shaft for driving said first mentioned shaft and having a pair of ports each adapted for alternative use as an inlet and an outlet depending upon the direction in which the motor is to be rotated; means for supplying pneumatic fluid medium under pressure; a control valve having an inlet connected to said supply means and having a pair of outlets; conduit means connecting said outlets and said ports for selectively directing the fluid medium to one of said ports; a valve in each of said conduit means constructed and arranged to vent said motor port when its said conduit means is not pressurized and to place said port in communication with said control valve when its said conduit means is pressurized; and a second valve in each of said conduit means constructed and arranged to alternatively vent one of said conduit means when the other of said conduit means is pressurized.

2. In a vehicle steering system, the combination of a steering gear mechanism including a rotatable shaft; a reversible pneumatic fluid driven motor of the air turbine type through which the fluid passes including a rotatable shaft for driving said first mentioned shaft and having a pair of ports each adapted for alternative use as an inlet and an outlet depending upon the direction in which the motor is to be rotated; means for supplying fluid medium under pressure; a control valve having an inlet connected to said supply means and having a pair of outlets; a pair of conduit means connecting said outlets and said ports for selectively directing the fluid medium to one of said ports; a pressure operated valve in each of said conduit means constructed and arranged to vent said port when said conduit means is not pressurized and to place said port in communication with said control valve when said conduit means is pressurized; a second valve in each of said conduit means; and piston means connected to said second valves having opposed piston surfaces each in communication with one of said conduit means constructed and arranged to open said second valve in one of said conduit means for venting said conduit means when the other of said conduit means is pressurized.

3. A system according to claim 2, wherein each of said first valves include a casing, an inlet, an outlet, and venting port means in said casing, a valve seat positioned in said casing between said outlet and said venting port, valve member means adapted to abut said seat to seal said outlet from said venting port, and piston means in communication with said inlet constructed and arranged to move said valve member means against said seat in response to pressure at said inlet.

4. A system according to claim 3, wherein said last mentioned piston means is positioned between said inlet and said outlet, and includes check valve means for providing communication between said inlet and said outlet.

5. A control unit for use in a pneumatic system in which a pair of conduits alternatively deliver pressurized gas to a reversible air operated device, said unit comprising a casing having a pair of passageways therein each provided with an inlet port adapted for connection to one of the conduits, outlet ports adapted for connection to the air operated device, and a first and a second venting port between each of said inlet and outlet ports; a pressure operated valve in each of said passageways between said first and second venting ports constructed and arranged to respectively place said second venting port and said outlet port of one passageway in communication when said passageway is not pressurized and to place said inlet port and said outlet port of the other passageway in communication when said passageway is pressurized; a valve for each of said first venting ports; and piston means having opposed piston surfaces each in communication with one of said inlet ports and constructed and arranged to open said last mentioned valve which is associated with one of said passageways when the other of said passageways is pressurized.

6. A control unit according to claim 5, wherein each of said pressure operated valves include a valve seat in said passageway between said second venting port and said outlet, valve member means adapted to abut said seat to seal said outlet from said second mentioned venting port, a piston formed with an opening and connected to said valve member means and positioned in said passageway between said inlet port and said second venting port to move said valve member means against said seat when said passageway is pressurized, and check valve means for said opening in said piston for providing communication between said inlet port and said outlet port when said passageway is pressurized.

References Cited in the file of this patent

UNITED STATES PATENTS

| | | |
|---|---|---|
| 2,225,518 | Blasig | Dec. 17, 1940 |
| 2,508,057 | Bishop | May 16, 1950 |